(Model.)
J. P. FULGHAM.
FENCE MACHINE.
No. 330,887. Patented Nov. 24, 1885.
2 Sheets—Sheet 1
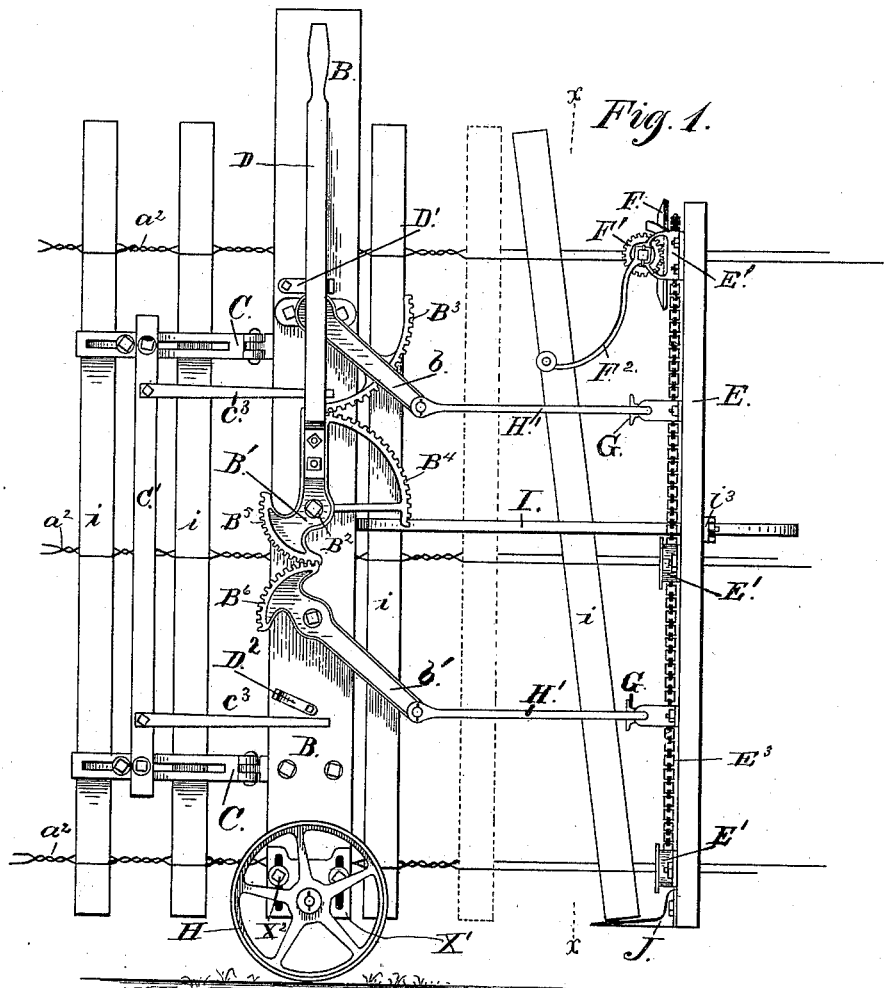
Witnesses
Caleb S. Dubbadway
Jas. H. Nichols
Inventor
Jesse P. Fulgham
by W. T. Dennis
attorney

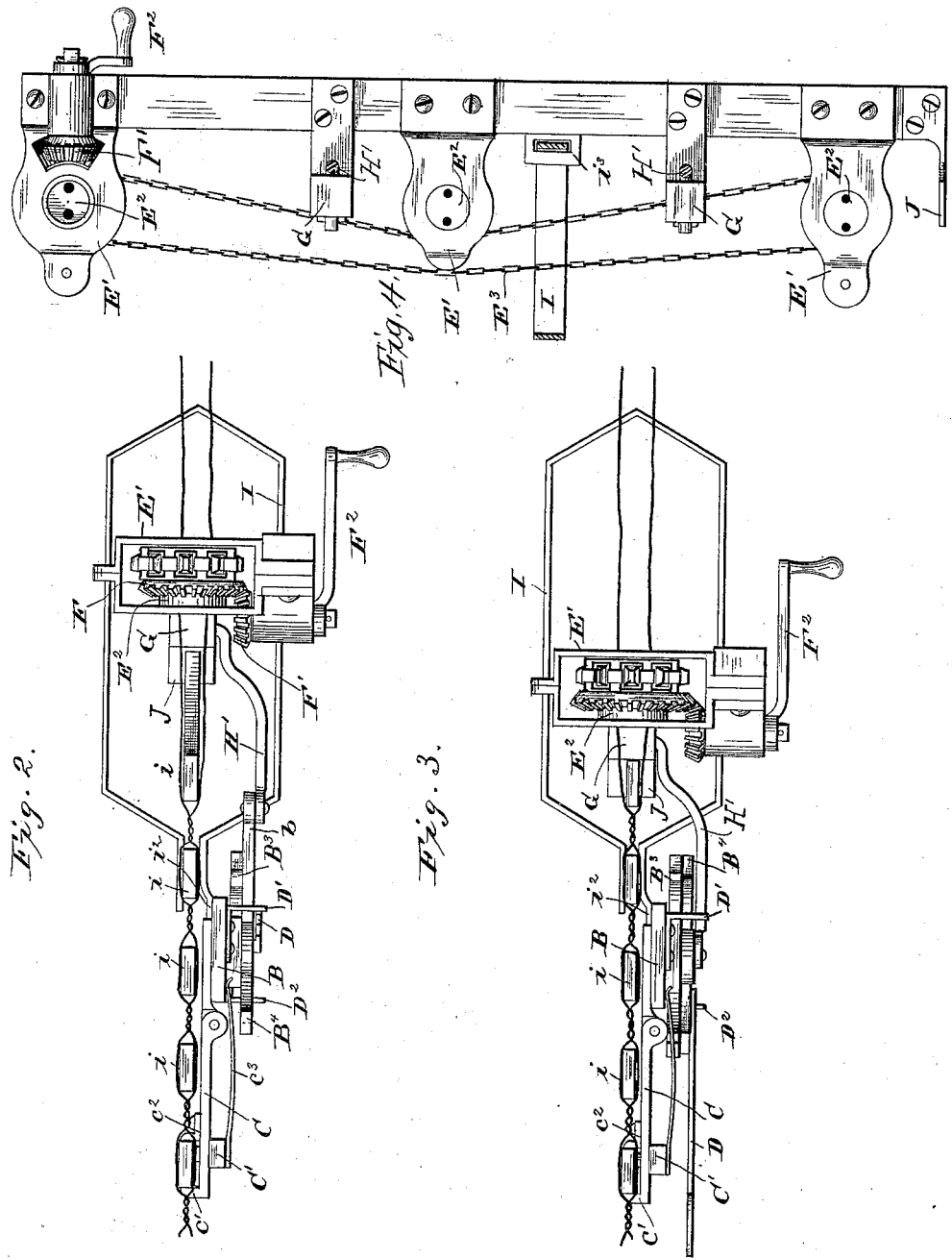

UNITED STATES PATENT OFFICE.

JESSE P. FULGHAM, OF RICHMOND, INDIANA, ASSIGNOR OF ONE-HALF TO THE WAYNE AGRICULTURAL COMPANY, OF SAME PLACE.

FENCE-MACHINE.

SPECIFICATION forming part of Letters Patent No. 330,887, dated November 24, 1885.

Application filed September 7, 1885. Serial No. 176,343. (Model.)

*To all whom it may concern:*

Be it known that I, JESSE P. FULGHAM, of Richmond, in the county of Wayne and State of Indiana, have invented certain new and useful Improvements in Fence-Machines; and I do hereby declare the following to be a full, clear, and exact description of the same, reference being had to the accompanying drawings, forming a part of this specification, and to the figures and letters of reference marked thereon.

My invention relates to that class of fence-machines which operate to apply pickets to line-wires, and particularly to that subordinate class which form the fence in the field at the point and in the position where it is desired to be permanently located.

It consists in certain novel features of construction and combinations of parts, which will be first described at length in the following specification, and will then be pointed out particularly in the several clauses of claim at the end of the same.

Figure 1 represents a side elevation of the machine constructed in accordance with my invention, shown connected to a fence in process of construction. Figs. 2 and 3 are top plan views of said machine, showing the position of the parts at different stages of the operation. Fig. 4 is a cross-sectional view taken on the line $x\ x$, Fig. 1, and looking toward the twisters.

In the fence constructed by my machine three pairs of line-wires, $a^2\ a^2$, are preferably employed, one being arranged near the top, another near the bottom, and the third at or about the middle of the pickets. These pairs of wires are connected at one end to a strong post suitably braced, and are held under tension by any suitable means which will permit them to give slightly when the pickets are applied to them.

B represents the main bar or frame of the machine. This bar is supported at its lower end upon a wheel, H, which rests upon the ground, and to it are connected two or more hinged clamping-arms, C C, adapted to extend along one side of the fence, each being provided with a fixed jaw, $c'$, and an adjustable jaw, $c^2$. By moving the adjustable jaws $c^2$ and locking them in adjusted position, pickets of different widths are enabled to be grasped. A bar, C', connects the upper and lower clamping-arms together, and is provided with springs $c^3$, whose free ends bear upon the main bar B, and tend to keep the jaws of the clamping-arms in engagement with one or the other of the fence-pickets $i$. Also, mounted on the main bar B is a plate, B', pivoted at B$^2$, and having an upper gear-segment, B$^4$, and a lower gear-segment, B$^5$, which co-operate, respectively, with other gear-segments, B$^3$ and B$^6$. The segment B$^3$ is connected to a crank-arm, $b$, and the segment B$^6$ is connected to a crank-arm, $b'$. An operating handle or lever, D, is connected to the central arm or plate, B', and when moved down to the left operates to throw the crank-arms $b\ b'$ down into line with the main supporting-bar B, and when moved up again, to throw said crank-arms out into the position shown in Fig. 1. A stop, D', engages with the handle D, and serves to limit the throw of the crank-arms in one direction, and a similar stop, D$^2$, engages with the lower crank-arm, $b'$, and serves to limit the movement of the crank-arms in the opposite direction.

E represents what may be termed the twister "bar" or "frame." Upon it are supported in suitable boxes or bearings, E', three twisting-wheels, E$^2$, each of which is provided with two apertures for the passage of one of the pairs of line-wires, and with spur-teeth adapted to engage with an endless sprocket-chain, E$^3$. One of the twisting-wheels, and preferably the upper one, has connected to it a bevel-wheel, F, into which meshes a small bevel-pinion, F', mounted on a short shaft, to which is secured a hand-crank, F$^2$. By operating the hand-crank to the right or to the left the twisting-wheels are caused, by means of the endless chain, to simultaneously rotate, and in rotating to twist together one or more times the strands of wire passing through them. The twister-bar, it will be observed, is supported entirely by the line-wires, but its vertical position is maintained by means of the connecting-rods H', which are jointed at one end to what may be termed "beater-arms" G, and at the other end to the crank-arms $b\ b'$, respectively. The beater-arms G are secured rigidly to the twister-frame, and their striking faces project in the plane of the pickets, as shown in Figs. 2 and 3. A spring-bar, I, is pivoted to the inner side of the main bar or frame B at $i^2$, and extends thence through a loop or eye, $i^3$, on the twister-frame, and thence across to the opposite side of the fence and back again nearly to the point from whence it started. The object of this spring is to at all times hold the main bar in operative position up against the fence, and at the same time to permit said main bar to be readily shifted longitudinally of the fence when necessary.

The machine has now been sufficiently described, it is thought, to enable its operation to be readily understood. Assuming, then, that the line-wires have been passed through the twister-wheels, fastened to the starting-post, and made taut, the operation is as follows: The main bar is moved up opposite the starting-post, and the operating-handle D is swung down to its lowest position, which causes the cranks $b$ $b'$ to be retracted, so as to draw the twister-frame toward the main bar or frame B till its beaters G come in contact with the post. The hand-crank is then given one or more turns, which causes a preliminary twist to be simultaneously given each pair of line-wires. This done, the handle D is moved upward sufficiently to cause the cranks $b$ $b'$ to be projected far enough to slide the twister-frame forward and permit a picket, $i$, to be slipped down between the several pairs of wires till its lower end rests upon a foot-bracket, J, projecting from the lower end of the twister-frame. Without changing the position of the main bar B the operating-handle D is then again quickly moved down, thereby causing the twister-frame to advance quickly toward the post and its beaters G to crowd the picket firmly up against the twists in the wires into a position corresponding to that shown in dotted lines, Fig. 1; then, while the pressure is still against the picket, the hand-crank is given one or more turns in an opposite direction, which causes the pickets to be tightly and firmly held in the loops of the wires thus formed, so firmly, indeed, that it will be found impossible to drive it out with a mallet. The first picket being thus secured, the twister-frame is again moved forward by a movement of the operating-handle, so as to permit of the introduction of another picket, which latter is then in like manner driven along, held in position, and secured by twisting the wires as before, this operation being repeated until the forward throw of the twister-frame by the operating-handle becomes so short as to render it necessary to shift the position of the main bar or frame B farther along the fence. When the main bar is so shifted, the jaws $c'$ $c^2$ of its clamping-arms C are caused to engage with one or the other of the pickets already applied, and thus serve to anchor the main bar or frame of the machine till a further change of position becomes necessary. Fig. 1 shows the clamping-jaws thus engaged with a picket.

It will be noticed that the gearing by which the twister-frame is made to move back and forth is located upon the main bar or frame B, and it is apparent that so long as said main bar remains fixed by reason of being clamped to the completed post of the fence the said twister-frame will be compelled to approach said main bar at each movement of the operating-handle in the proper direction. It is equally apparent, however, that if the twister-frame be held stationary, and the main bar or frame be loosened or disconnected from the fence, the same gearing and connections would cause a reverse movement to take place—that is to say, would cause the main bar to approach the twister-frame. I avail myself of this peculiarity in the construction of my machine to effect the shifting of the main bar or body along the line of the fence, and when, therefore, the stroke of the reciprocating twister-frame becomes so short as to prevent the insertion of another picket between the wires I move the operating-handle until the beaters bear against the last picket secured, and then, after having disengaged the clamping-arms of the main bar from the fence by pulling outwardly upon the connecting-bar C', I pull down upon the operating-handle, and thereby cause the main bar and its connections to move forward toward the twister-frame till the limit of movement is reached, when the jaws of the clamping-arms are permitted to engage with another picket, and thereby again anchor the main bar and permit the twisting-frame to approach and recede from it as before.

The importance of the spring I in keeping the machine close up to the fence in operative position will readily be appreciated. It is pivoted to the main bar B, and loosely connected to the twister-frame by the loop or eye $i^3$, so as to permit the necessary vertical independent movement of the latter required where a fence is being constructed on the side of a hill.

The wheel H, upon which the main bar B is supported, is rendered adjustable by means of a slotted bearing plate or bracket, X', and set-screws $X^2$, so as to hold the bar B at the proper point with respect to the position of the line-wires.

I claim as my invention—

1. In a fence-making machine, a twisting-frame carrying a series of twisters, and means for rotating them, and supported entirely by the line-wires of the fence, in combination with mechanism for imparting reciprocating motion to said twister-frame back and forth upon the line-wires, substantially as described.

2. In a fence-making machine, a main bar or frame provided with devices for firmly securing it alongside of the line of the fence, in combination with a twister-frame carrying twisters, and means for rotating them, and supported entirely by the line-wires of the fence, and with gearing, substantially such as described, mounted on the main frame or bar and connected to the twister-frame, for imparting to the twister-frame reciprocating motion upon the line-wires, substantially as described.

3. In a fence-making machine, a twisting-frame carrying twisters, and means for rotating them, and supported entirely by the line-wires of the fence, in combination with beaters mounted upon the twister-frame and projecting in the plane of the pickets, and with mechanism for imparting a reciprocating motion to said twister-frame back and forth upon the line-wires, substantially as described.

4. In a fence-making machine, a twisting-frame carrying twisters, and means for rotating them, and supported entirely by the line-wires of the fence, in combination with a foot-bracket for supporting the lower end of the picket, and also carried by the twister-frame, and mechanism for imparting reciprocating motion to said twister-frame and parts carried thereby back and forth upon the line-wires, substantially as described.

5. In a fence-making machine, an adjustable main bar or frame provided with clamps for securing it to one or the other of the fence-pickets, so as to prevent movement of the said frame longitudinally of the fence, in combination with a twister-frame carrying twisters, and means for rotating them supported entirely by the line-wires of the fence, and mechanism, substantially as described, mounted upon the main frame, for imparting reciprocating motion to the twister-frame, substantially as described.

6. In a fence-making machine, and in combination with the main frame or bar thereof, a clamping-spring connected to said main bar on one side of the fence and extending to the other side of the fence, where it has a bearing upon one or more of the secured pickets, substantially as described.

7. In a fence-making machine, and in combination with the main frame or bar thereof, a clamping-spring connected to the main frame or bar on one side of the fence and extended forward of the picket last applied, and thence to the opposite side of the fence and back to a point which will give it a bearing upon one or more of the applied pickets, substantially as described.

8. In a fence-making machine such as described, and in combination with the main bar or frame thereof, the clamping-arms applied to said main bar, and having jaws for engaging with one of the secured pickets to prevent the movement of said bar or frame longitudinally of the fence, and the clamping-spring secured to said main frame or bar and extending around to the opposite side of the fence, and operating at all times to keep the main bar or frame close up against the fence, substantially as described.

9. In the herein-described fence-making machine, the combination, with the main bar or frame, of the hinged clamping-arms provided with jaws for engaging with a picket, and springs for holding said clamping-arms in engagement with the picket, substantially as described.

10. In the herein-described fence-making machine, the combination, with the twister-frame having the twisters, and means for operating them, and supported entirely upon the line-wires of the fence, of the actuating crank-arms mounted on the main frame or bar, and the connecting-rods between said crank-arms and twister-frame applied to the twister-frame at points above and below the middle thereof, so as to maintain the vertical position of the same, substantially as described.

11. In the herein-described fence-making machine, the combination, with the reciprocating twister-frame, of the main bar or frame having mounted upon it the operating-handle, the actuating-cranks, and the intermediate gear-segments, and the rods connecting the operating-cranks to the reciprocating twister-frame, substantially as described.

12. The combination, of the main frame or bar carrying the operating-handle, the actuating crank-arms, and the intermediate gear-segments, with the reciprocating twister-frame connected to the actuating-cranks and supported entirely upon the line-wires of the fence, and with means, substantially such as described, for detachably connecting the main bar or frame to the completed portion of the fence, whereby upon the movement of the operating-handle the twister-frame will be caused to approach the main bar or frame, or the main bar or frame will be caused to approach the twister-frame, accordingly as the main bar or frame is connected to or disconnected from the fence, substantially as described, and for the purpose specified.

13. In the herein-described fence-making machine, the combination of the reciprocating twister-frame supported entirely upon the line-wires with the main bar or frame carrying mechanism, substantially such as described, for imparting reciprocating motion to the twister-frame, and a vertically-adjustable wheel applied to the lower end of the frame, substantially as described, and for the purpose specified.

In testimony whereof I affix my signature in presence of two witnesses.

JESSE P. FULGHAM.

Witnesses:
W. T. DENNIS,
JAS. W. NICHOLS.